(12) United States Patent
Kang et al.

(10) Patent No.: US 8,903,455 B2
(45) Date of Patent: Dec. 2, 2014

(54) APPARATUS FOR TRANSCEIVING A SIGNAL IN A DISTRIBUTED ANTENNA SYSTEM

(75) Inventors: Ji Won Kang, Anyang-si (KR); Su Nam Kim, Anyang-si (KR); Bin Chul Ihm, Anyang-si (KR); Jin Young Chun, Anyang-si (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 13/520,948

(22) PCT Filed: Jan. 14, 2011

(86) PCT No.: PCT/KR2011/000295
§ 371 (c)(1),
(2), (4) Date: Jul. 6, 2012

(87) PCT Pub. No.: WO2011/090294
PCT Pub. Date: Jul. 28, 2011

(65) Prior Publication Data
US 2013/0040676 A1 Feb. 14, 2013

Related U.S. Application Data

(60) Provisional application No. 61/296,481, filed on Jan. 20, 2010.

(30) Foreign Application Priority Data

May 20, 2010 (KR) .......................... 10-2010-0047327

(51) Int. Cl.
*H04M 1/00* (2006.01)
*H04B 7/04* (2006.01)
*H04W 88/08* (2009.01)

(52) U.S. Cl.
CPC ........... *H04B 7/0495* (2013.01); *H04W 88/085* (2013.01)
USPC .......................... 455/562.1; 455/450; 455/509

(58) Field of Classification Search
USPC ....................................... 455/450, 509, 562.1
See application file for complete search history.

(56) References Cited

U.S. PATENT DOCUMENTS

2006/0018394 A1 1/2006 Van Zelst et al.
2009/0257520 A1 10/2009 Lin et al.

OTHER PUBLICATIONS

Stevenson et al., "IEEE 802.22: The First Cognitive Radio Wireless Regional Area Network Standard," IEEE Standards in Communications and Networks, IEEE Communications Magazine, Jan. 2009, pp. 130-138.

*Primary Examiner* — Raymond Dean
(74) *Attorney, Agent, or Firm* — Birch, Stewart, Kolasch & Birch, LLP

(57) ABSTRACT

The present invention relates to a signal-transceiving apparatus for a base station in a distributed antenna system (DAS), comprising: a transmitting module for transmitting a signal; an antenna module which includes a plurality of antennas, and in which a predetermined number of pilot patterns are used in accordance with the size of the coverage area, which is a signal-transmitting range for each of the plurality of antennas, and in accordance with the number of overlapping antenna coverage areas; and a processor which transmits, via the transmitting module, a signal to a terminal using a pilot pattern corresponding to a portion of the plurality of antennas. The same pilot pattern is used for the antennas, the antenna coverage areas of which do not overlap, from among the plurality of antennas.

14 Claims, 12 Drawing Sheets

APPARATUS FOR TRANSCEIVING A SIGNAL IN A DISTRIBUTED ANTENNA SYSTEM

CROSS-REFERENCE TO RELATED APPLICATIONS

This application is the National Phase of PCT/KR2011/000295 filed on Jan. 14, 2011, which claims priority under 35 U.S.C. 119(e) to U.S. Provisional Application No. 61/296,481 filed on Jan. 20, 2010 and under U.S.C. 119(a) to Patent Application No. 10-2010-0047327 filed in the Republic of Korea on May 20, 2010, all of which are hereby expressly incorporated by reference into the present application.

TECHNICAL FIELD

The present invention relates to a wireless communication system, and more particularly to, an apparatus for transceiving a signal in a distributed antenna system (DAS).

BACKGROUND ART

With the development of the information industry, the technology that can transmit various kinds of large data at high speed has been required. In this respect, a DAS that provides a plurality of distributed antennas within an existing cell has been studied to remove a shade zone and extend coverage.

The distributed antenna system (DAS) uses a plurality of distributed antennas connected with a single base station through a cable or a dedicated line, wherein the single base station manages a plurality of antennas located within a cell at predetermined intervals. The DAS provided with a plurality of antennas located within a cell at predetermined intervals is different from a centralized antenna system (CAS) provided with a plurality of antennas centralized at the center of a cell. Generally, the CAS uses various multi-antenna systems such as an open loop-multi input multi output (OL-MIMO) system, a close loop-single user-multi input multi output (CL-SU-MIMO) system, a close loop-multi user-multi input multi output (CL-MU-MIMO) system, and a multi-base station-multi input multi output (multi-BS-MIMO) system in such a manner that multiple antennas are installed in one base station in a cell based structure of a cellular communication system such as a wideband code division multiple access (WCDMA) system, a high speed packet access (HSPA) system, a long term evolution (LTE)/long term evolution-advanced (LTE-A) system, and a 802.16 system.

The DAS is different from a femto cell in that all distributed antennas located within a cell are managed by a base station at the center of the cell not each unit of the distributed antennas. Also, the DAS is different from a multi-hop relay system or ad-hoc network in that distributed antenna units are connected with one another through a cable or a dedicated line, wherein the multi-hop relay system or ad-hoc network includes a base station connected with a relay station (RS) through a wireless mode. Moreover, the DAS is different from a repeater, which simply amplifies and transmits a signal, in that each of distributed antennas can transmit different signals to different user equipments located near the antennas in accordance with a command of a base station.

This DAS may be regarded as a multiple input multiple output (MIMO) system in that distributed antennas can support a single user equipment or multiple user equipments by transmitting and receiving different data streams at the same time. In view of the MIMO system, the DAS is advantageous in that it can reduce a transmission power as a transmission zone is more reduced than that of the CAS due to distributed antennas distributed at various locations within a cell. Also, the DAS can reduce path loss by reducing a transmission distance between the antenna and the user equipment, thereby enabling high rate transmission of data. As a result, the DAS can enhance transmission capacity and power efficiency of the cellular system, and can satisfy communication throughput of quality more relatively uniform than that of the CAS regardless of user location within the cell. Also, since the base station is connected with a plurality of distributed antennas through a cable or a dedicated line in the DAS, signal loss is reduced, and correlation and interference between the antennas are reduced, whereby a high signal to interference to noise ratio (SINR) can be obtained.

As described above, in order to reduce facility costs of the base station and maintenance costs of a backhaul network in a next generation mobile communication system and at the same time extend service coverage and improve channel capacity and SINR, the DAS can be a new basis of cellular communication by being compatible with the existing CAS or replacing with the CAS.

DISCLOSURE

Technical Problem

In a wireless communication system, since a signal is transmitted through a radio channel, signal distortion may occur during transmission of the signal. Accordingly, a receiving side should compensate distortion of the received signal by using channel information on the radio channel, whereby a transmitting side may detect the original signal to be transmitted. In order that the receiving side discovers the channel information, it is required to transmit the signal known by both the transmitting side and the receiving side and discover the channel information using a distortion level of the signal when the signal is transmitted through the channel.

The signal transmitted for estimation of the channel information between the transmitting side and the receiving side will be referred to as a pilot signal or a reference signal. In case that multiple antennas are used to transmit and receive data, the receiving side should know the channel status between each transmitting antenna and each receiving antenna to receive a normal signal. Accordingly, it is preferable that a separate reference signal per transmitting antenna should be provided.

In the existing CAS based communication standard, different pilot patterns per antenna are used to reduce interference between the antennas. For example, in the CAS based communication standard of 3GPP LTE-A or IEEE 802.16m, maximum eight pilot patterns are defined in accordance with a rule of the number of antennas of a base station, and pilot signals based on each pilot pattern are transmitted from different frequency/time resource regions.

However, in the DAS in nine or more antennas or antenna nodes may be used, a problem occurs in that the existing CAS based communication standard, which uses maximum eight pilot patterns, may be used as it is.

Also, if pilot patterns equivalent to the number of maximum available antennas are defined in the DAS to identify each antenna or antenna node, since more resources should be allocated for pilot transmission to reduce interference between the pilot signals, whereby a problem occurs in that pilot overheads is rapidly increased.

Accordingly, an object of the present invention devised to solve the aforementioned problems is to provide a method for supporting a DAS, which uses a certain number of limited pilot patterns for a plurality of distributed antennas and an apparatus for the method.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To solve the aforementioned technical problems, according to one aspect of the present invention, a base station in a distributed antenna system (DAS) comprises a transmission module for transmitting a signal; an antenna module which includes a plurality of antennas, and in which a predetermined number of pilot patterns are used in accordance with the size of the coverage area, which is a signal transmission range for each of the plurality of antennas, and in accordance with the number of overlapped coverage areas of the plurality of antennas; and a processor which transmits, through the transmission module, a signal to a user equipment using a pilot pattern corresponding to at least one of the plurality of antennas, wherein the same pilot pattern is used for the antennas of which antenna coverage areas are not overlapped with each other, among the plurality of antennas.

The processor may generate control information, which includes information on the number of the pilot patterns used in the antenna module, and transmit the generated control information to the user equipment through the transmission module.

Preferably, different pilot patterns may be used for the antennas of which coverage areas are overlapped with each other, among the plurality of antennas.

The first antenna of the plurality of antennas according to one embodiment of the present invention may use the same pilot pattern as a pilot pattern used by the second antenna of which coverage area is overlapped with coverage area of the first antenna, wherein the first antenna and the second antenna may use the same pilot patterns at different frequency or time resource regions.

In this case, the first antenna may be either the antenna added after the predetermined number of pilot patterns are configured in the antenna module or the antenna located in a cell where the number of overlapped coverage areas of the plurality of antennas is more than a predetermined reference, among cells for which the base station provides a service.

Also, the processor may generate information on pilot patterns of the first antenna and transmit the generated information to the user equipment through the transmission module, and the pilot pattern information on the first antenna may include resource division mode information on the pilot patterns to which resource division is applied or index information on the pilot patterns to which resource division is applied.

The first antenna of the plurality of antennas according to another embodiment of the present invention may use the same pilot pattern as a pilot pattern used by the second antenna of which coverage area is overlapped with coverage area of the first antenna and which is adjacent to the first antenna, and the first antenna and the second antenna may use different pilot sequences at the same pilot pattern.

To solve the aforementioned technical problems, according to another aspect of the present invention, a user equipment in a distributed antenna system (DAS) comprises a reception module for receiving a signal; and a processor which performs channel estimation for a channel over which the signal is transmitted, by using the received signal, wherein the processor performs the channel estimation for each of pilot patterns for the received signal on the basis of information on a predetermined number of the pilot patterns used in accordance with the size of the coverage area, which is a signal transmission range for each of a plurality of antennas, and in accordance with the number of overlapped coverage areas of the plurality of antennas received from a base station that includes the plurality of antennas, through the reception module.

The processor may receive pilot pattern information on a specific antenna through the reception module, wherein the specific antenna uses the same pilot pattern as pilot pattern of a neighboring antenna of which coverage area is overlapped with coverage area of the specific antenna, among the plurality of antennas of the base station, and uses the same pilot pattern at different frequency or time resource regions.

The processor may perform channel estimation for each of the pilot patterns for the received signal on the basis of the pilot pattern allocation information and the pilot pattern information on the specific antenna.

To solve the aforementioned technical problems, according to still another aspect of the present invention, a method for transmitting a signal from a base station to a user equipment in a distributed antenna system (DAS) comprises the steps of allocating a predetermined number of pilot patterns to a plurality of antennas in accordance with the size of the coverage area, which is a signal transmission range for each of the plurality of antennas, and in accordance with the number of overlapped coverage areas of the plurality of antennas; and transmitting the signal to the user equipment through a specific antenna or antenna group associated with the user equipment in accordance with pilot patterns allocated to the plurality of antennas, wherein the same pilot pattern is allocated to the antennas of which coverage areas are not overlapped with each other, among the plurality of antennas.

The method according to one embodiment of the present invention may further comprise the step of transmitting control information, which includes information on the number of the pilot patterns allocated to the plurality of antennas, to the user equipment.

To solve the aforementioned technical problems, according to further still another aspect of the present invention, a method for receiving a signal in a user equipment from a base station in a distributed antenna system (DAS) comprises the steps of receiving control information from the base station, which includes a plurality of antennas, the control information including pilot pattern allocation information on a predetermined number of pilot patterns allocated in accordance with the size of the coverage area, which is a signal transmission range for each of the plurality of antennas, and in accordance with the number of overlapped coverage areas of the plurality of antennas; and receiving the signal transmitted in accordance with the pilot pattern allocation information through a specific antenna or antenna group of the base station, wherein the same pilot pattern is allocated to the antennas of which coverage areas are not overlapped with each other, among the plurality of antennas.

The method according to one embodiment of the present invention may further comprise the step of performing channel estimation for each of pilot patterns for the received signal on the basis of the pilot pattern allocation information.

In the aforementioned embodiments, antenna or antenna group may be used as antenna port in the LTE/LTE-A.

The aforementioned technical solutions are only a part of the preferred embodiments of the present invention, and various modifications to which technical features of the present invention are applied could be understood by the person with ordinary skill in the art to which the present invention pertains, based on the following detailed description of the present invention.

Advantageous Effects

According to the embodiments of the present invention as described above, a base station of a DAS can reduce pilot overhead by allocating a limited number of pilot patterns to a plurality of antennas and reduce interference between neighboring antennas by allocating different pilot resources to the neighboring antennas.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE FOR CARRYING OUT THE INVENTION

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out. The following detailed description includes detailed matters to provide full understanding of the present invention. However, it will be apparent to those skilled in the art that the present invention can be carried out without the detailed matters. For example, although the following description will be made based on IEEE 802.16 system, the IEEE 802.16 system is only exemplary and the following description may be applied to various wireless communication systems including a 3rd generation partnership project (3GPP) system.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

Moreover, in the following description, it is assumed that a user equipment (UE) will refer to a mobile or fixed type user terminal device such as a mobile station (MS). Also, it is assumed that a base station will refer to a random node of a network terminal that performs communication with a user equipment, such as Node B (NB), eNode B (eNB), and processing server (PS).

Figure 1:
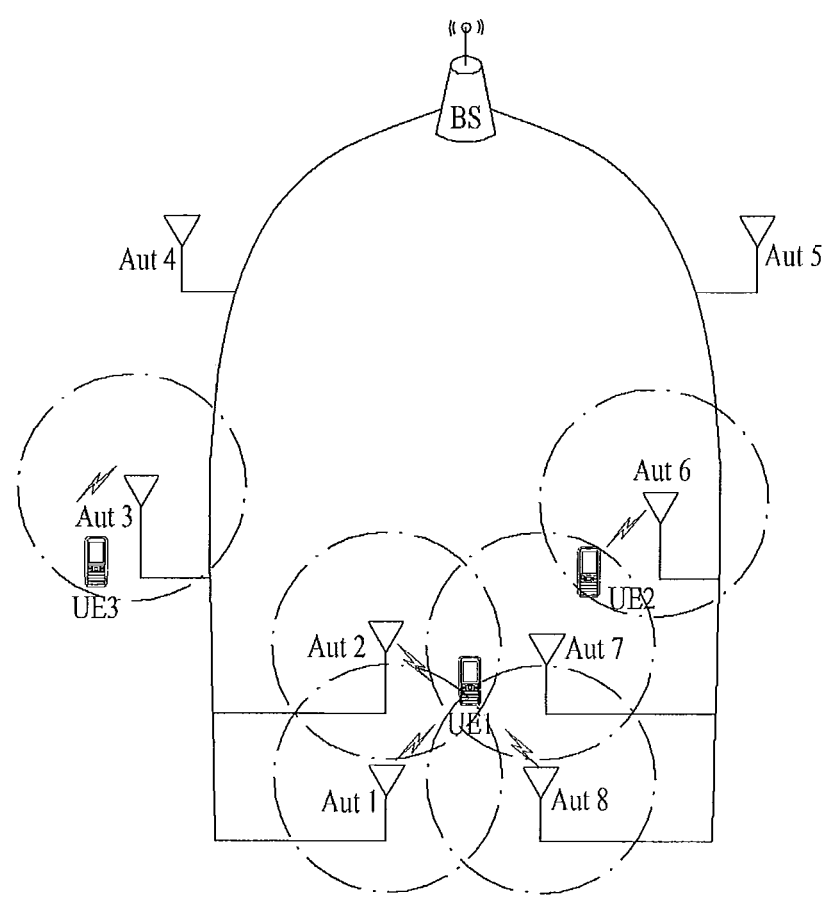
FIG. 1 is a diagram illustrating an example of a DAS structure to which the present invention is applied.

FIG. 1 is a diagram illustrating an example of a DAS structure to which the present invention is applied.

The base station illustrated in FIG. 1 includes a plurality of antennas located at the center of a cell in accordance with a CAS. For conciseness of description, DAS antennas are only illustrated in FIG. 1. In a DAS, a plurality of antennas connected with a single base station, which is located within a cell, through a cable are distributed at various locations within the cell. This DAS may be configured in various manners depending on the number and location of antennas. For example, a plurality of antennas may be distributed within the cell at constant intervals or two or more antennas may be centralized at a specific place. If coverage area of each of the distributed antennas is overlapped with that of another distributed antenna, signal transmission of rank 2 or more may be performed in the DAS regardless of the location of the distributed antennas within the cell. Rank means the number of data streams that can be transmitted at the same time through one or more antennas.

Referring to FIG. 1, one base station that supports one cell zone is connected with a total of eight antennas through a cable, wherein the respective antennas may be located at constant intervals or various intervals within the cell. In the DAS, all the antennas connected with the base station are not needed to be used, and a proper number of antennas may be used based on their signal transmission range, an overlap level of coverage and interference with their neighboring antenna, and the distance with the user equipment.

For example, if three user equipments (UE 1 to UE 3) are located within the cell and UE 1 is located within a signal transmission range of the antennas 1, 2, 7 and 8 as illustrated in FIG. 1, the UE 1 may receive a signal from one or more of the base station antennas 1, 2, 7 and 8. On the other hand, in view of the UE 1, it is likely that path loss may occur in the antennas 3, 4, 5 and 6 and power consumption may be increased therein due to a long distance between the corresponding antennas and the user equipment UE 1, and the signals transmitted from the antennas 3, 4, 5 and 6 may be small values that may be disregarded.

For another example, since the UE 2 is located in a portion where the signal transmission range of the antenna 6 is overlapped with that of the antenna 7, the signals transmitted through the other antennas except for the antennas 6 and 7 may be small or weak values that may be disregarded. Also, since the UE 3 is located within the signal transmission range of the antenna 3, it may exclusively receive the signal transmitted through the antenna 3.

As illustrated in FIG. 1, if a plurality of antennas are spaced apart from one another within the cell of the DAS, the DAS is operated like a MIMO system. The base station may perform communication with the UE 1 through an antenna group 1 configured by one or more of the antennas 1, 2, 7 and 8, communication with the UE 2 through an antenna group 2 configured by one or more of the antennas 6 and 7, and communication with the UE 3 through the antenna 3. At this time, the antennas 4 and 5 may perform transmission for the UE 3 and the UE 2, respectively, or may be operated in an idle state.

In other words, the DAS may include various data streams for transmission per user equipment (or for each user equipment which corresponds to a user) during communication with a single user or multiple users. Also, various antennas or antenna groups may be allocated to user equipments located within the cell supported by the base station in the DAS. A specific antenna or antenna group, which performs communication with a user equipment, may be fixed depending on the location of the corresponding user equipment located within the cell. Alternatively, the antenna or antenna group, which performs communication with a user equipment, may adaptively be changed depending on movement of the user equipment within the cell.

Figure 2:
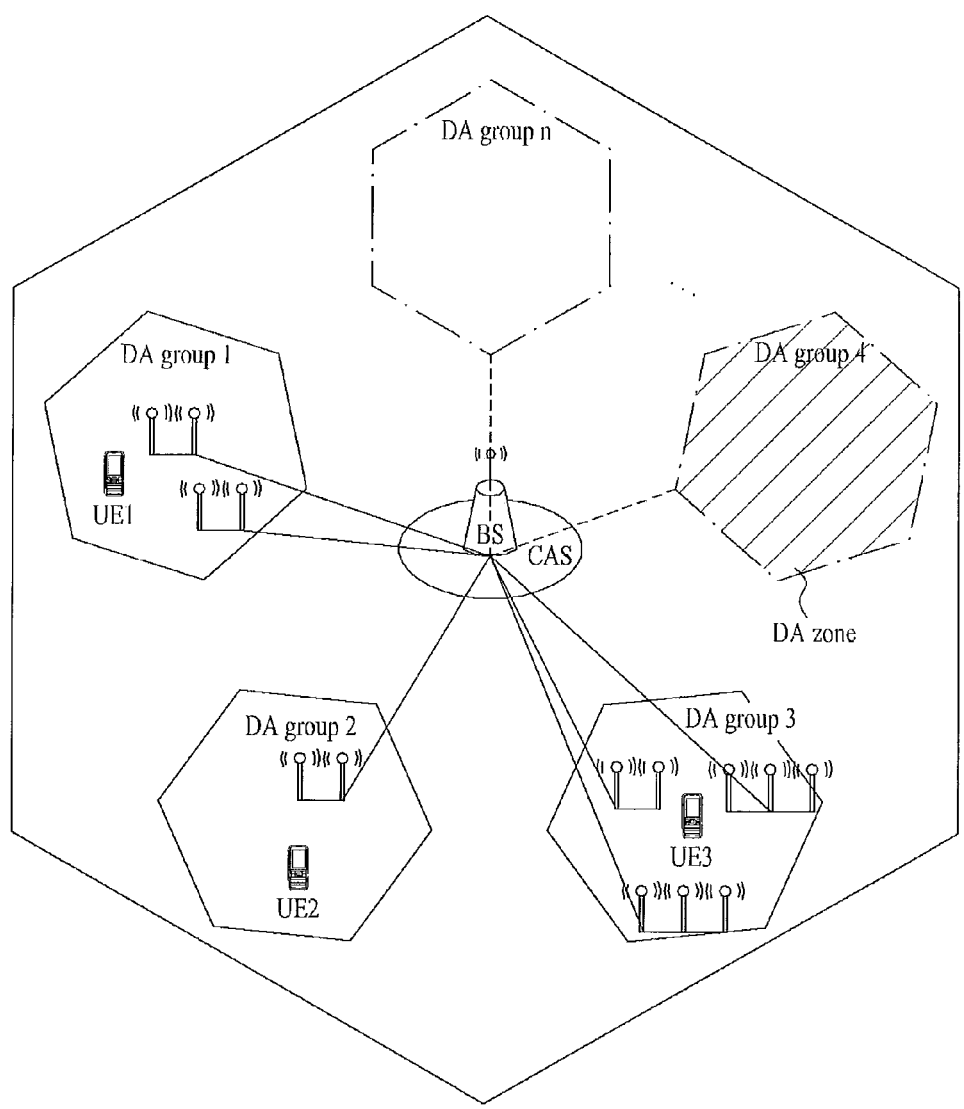
FIG. 2 is a diagram illustrating another example of a DAS structure to which the present invention is applied.

FIG. 2 is a diagram illustrating another example of a DAS structure to which the present invention is applied. In more detail, FIG. 2 illustrates an example of a system structure when a DAS is applied to a centralized antenna system that uses cell based multiple antennas according to the related art.

Referring to FIG. 2, a plurality of centralized antennas (CAs) having a similar effect in path loss due to an antenna interval shorter than a cell radius may be located at the center of a cell zone adjacent to the base station, wherein the cell zone is supported by the base station. Also, a plurality of distributed antennas (DAs) having different effects in path loss due to an antenna interval longer than the antenna interval of the CAs may be located at predetermined intervals within the cell zone.

The DAs are configured by one or more antennas connected from the base station through one cable, and may be used to refer to antenna node for DAS or antenna node. In other words, the antenna node includes one or more antennas, and the antennas constituting each antenna node are connected with one another through a cable. The one or more DAs form one DA group, thereby forming a DA zone.

The DA group, which includes one or more DAs, may variably be configured depending on the location or receiving status of the user equipment, or may fixedly be configured by the number of maximum antennas used in MIMO. According to the IEEE 802.16m, the number of maximum antennas is 8Tx. The DA zone is defined by the range that the antennas constituting the DA group can transmit or receive a signal.

The cell zone illustrated in FIG. 2 includes n number of DA zones. The user equipment that belongs to the DA zone may perform communication with one or more of the DAs constituting the DA zone, and the base station may increase a transmission rate by using the DAs and the CAs at the same time during signal transmission to the user equipment belonging to the DA zone.

A CAS that includes a DAS is illustrated in FIG. 2, whereby the base station and the user equipment may use the DAS in the CAS structure that uses multiple antennas according to the related art. Although the CAs and the DAs are located separately in FIG. 2 for conciseness of description, they may be located in various manners depending on their embodiments without limitation to the example of FIG. 2.

As described above, in the DAS, various number of data streams per user equipment during SU/MU MIMO communication may exist, a specific antenna or antenna group may be allocated to each of user equipments, wherein the specific antenna or antenna group allocated to the corresponding user equipment may be changed in real-time.

In this specification, transmitting antennas of the DAS may be the one or more distributed antennas or antenna group or may be used mixed with the one or more DAs or DA groups.

Also, if the LTE/LTE-A system supports the DAS, the antennas/antenna groups or DAs/DA groups described with reference to FIG. 1 and FIG. 2 may refer to one or more antenna ports. Hereinafter, antenna or pilot patterns in the embodiments of the present invention may be replaced with antenna ports.

In the meantime, as eight or more antennas are scheduled by one base station in the DAS, there is difficulty in application of the existing communication standards that define maximum eight antennas and pilot patterns. In this case, pilot may be referred to as various terminologies such as preamble, midamble, reference signal, common reference signal (CRS), and channel state information reference signal (CSI-RS).

Figure 3:
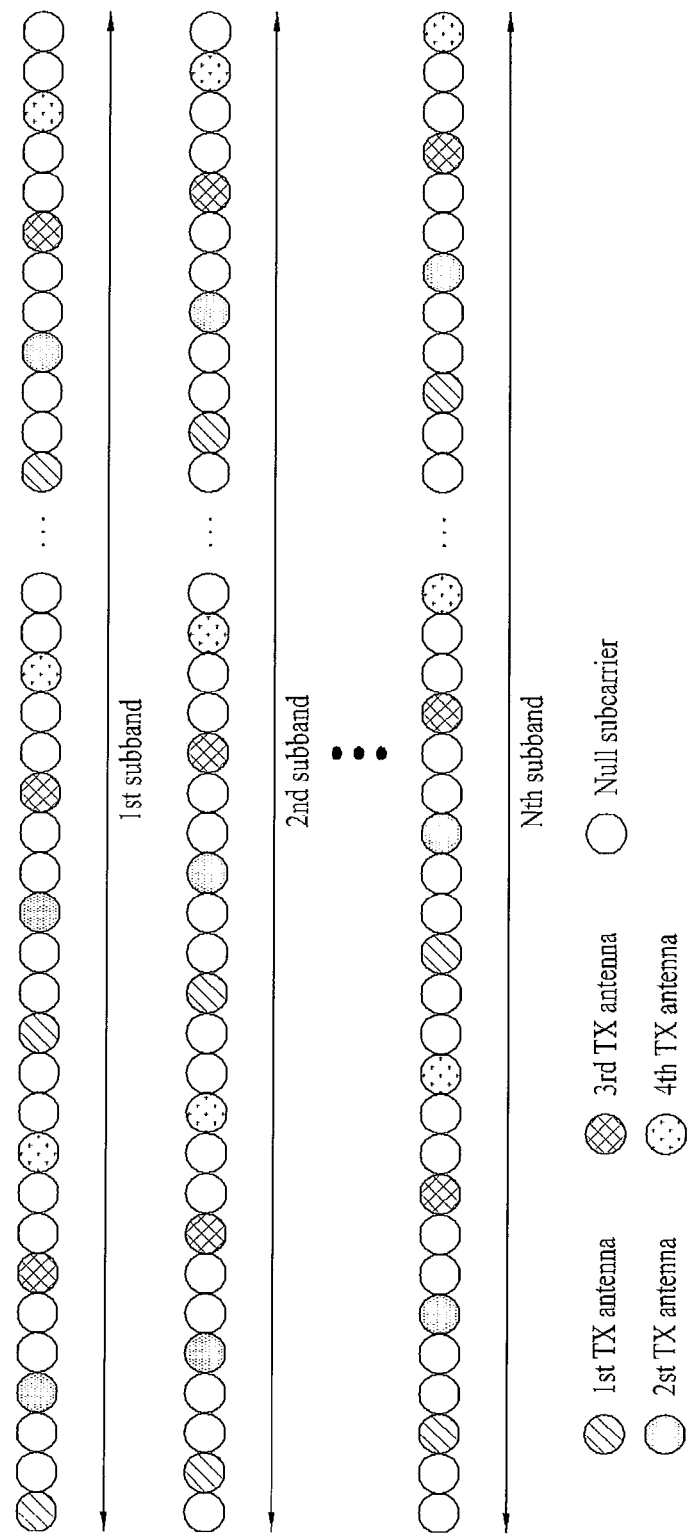
FIG. 3 is a diagram illustrating an example of pilot patterns transmitted in an IEEE 802.16m system.

FIG. 3 is a diagram illustrating an example of pilot patterns transmitted in an IEEE 802.16m system.

Referring to FIG. 3, if the number of antennas of the base station is 4 in the IEEE 802.16 system, pilot signals for each antenna are transmitted at the location of different subcarriers on a specific OFDM symbol within one frame. In other words, pilot patterns that use different frequency resources per antenna may be used. In this case, in order to maintain orthogonality between the pilot signals, each antenna does not transmit a signal at the location to which pilot for the other antenna is transmitted. The pilot patterns of FIG. 3 are exemplary and may be defined differently per antenna by using frequency/time/code resources or their combination.

If the pilot patterns are defined differently per antenna to reduce interference between pilot signals as shown in FIG. 3, resources corresponding to the number of antennas should be allocated for pilot transmission in the DAS that uses a plurality of antennas more than 8. In this case, if the subcarrier interval within each pilot pattern is maintained in the same manner as the existing manner to maintain the same channel estimation performance, pilot overhead is increased. If the distance between locations to which the pilot signals within the pilot patterns are transmitted is configured widely to reduce pilot overhead, channel estimation performance of pilot may be reduced.

Accordingly, the present invention is intended to suggest a method for allocating a certain number of pilot patterns without limitation of the number of antennas by allowing two or more antennas, which satisfy a predetermined condition, to use the same pilot pattern in a DAS that uses a plurality of distributed antennas. Hereinafter, in the drawings according to the embodiments of the present invention, $P_i$ indicates the ith pilot pattern.

1. First Embodiment

The Number of Antennas of which Coverage Areas are Overlapped with Each Other is Smaller than the Number of Pilot Patterns In the DAS according to one embodiment of the present invention, pilot patterns may be allocated depending on whether coverage of antennas is overlapped with another one. Coverage means a region where average received signal strength of antenna is more than a specific value, as described above.

Hereinafter, the embodiments of the present invention may be configured in such a manner that different pilot patterns are allocated to neighboring antennas of which coverage areas are overlapped with each other but the same pilot pattern may be used for the antennas of which coverage areas are not overlapped with each other.

Figure 4:
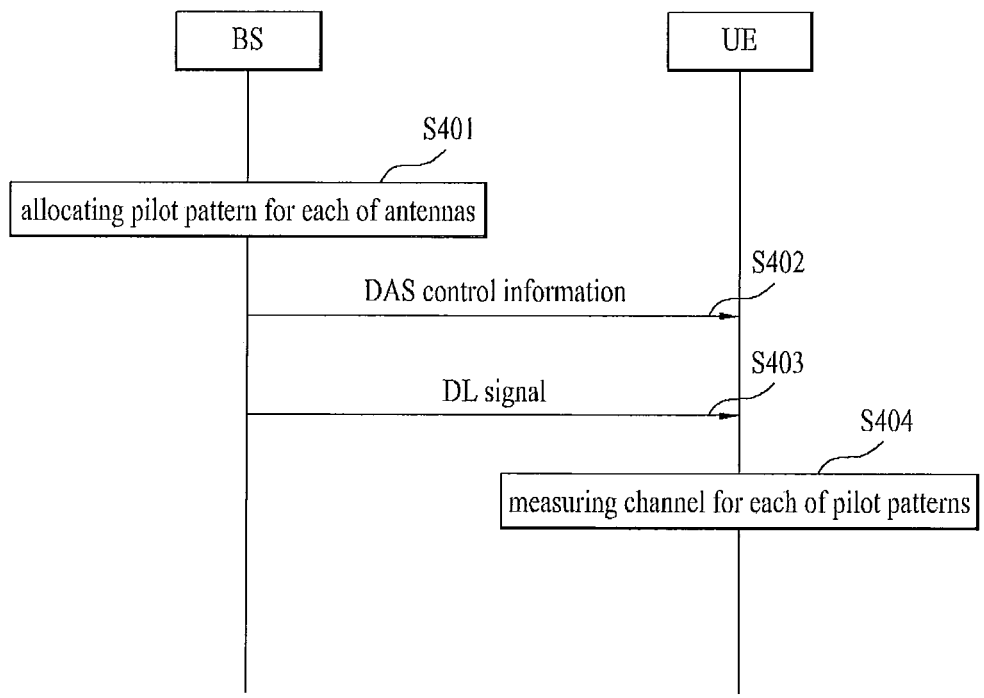
FIG. 4 is a diagram illustrating an example of transmitting and receiving a signal by allocating pilot patterns per antenna in a DAS according to one embodiment of the present invention.

FIG. 4 is a diagram illustrating an example of transmitting and receiving a signal by allocating pilot patterns per antenna in a DAS according to one embodiment of the present invention.

Referring to FIG. 4, a DAS base station according to one embodiment of the present invention allocates pilot patterns per antenna to allow two or more antennas to use the same pilot pattern depending on the coverage size of each of base station antennas distributed in a cell region and the number of overlapped coverage areas of the two or more antennas (S401). Pilot pattern allocation for each antenna may be performed during system basic configuration or may be changed semi-statically depending on specific conditions (for example, channel status, transmission mode change, etc.).

At this time, if coverage of an antenna is not overlapped with coverage of another antenna, all the distributed antennas of the base station may be configured to use the same pilot pattern. If a region where coverage areas of antennas are overlapped with each other exists, different pilot patterns are allocated for neighboring antennas of which coverage areas are overlapped with each other, to reduce interference between antennas, and the same pilot pattern may be allocated for the antennas of which coverage areas are not overlapped with each other.

Afterwards, the DAS base station transmits DAS control information, which includes information (for example, the number of pilot patterns, pilot pattern reuse factor, and configuration information of pilot patterns) on the pilot patterns allocated to DAS antennas, to the user equipment (S402). Transmission of the DAS control information may be performed periodically or may be performed based on an event. An event for transmission of the DAS control information includes a case where the user equipment enters a DAS cell or a case where the user equipment moves within a DAS cell. The DAS control information may be signaled to each UE (user equipment), or may be broadcasted to UEs within a DAS cell through system information.

Also, the DAS control information may further include configuration information (for example, configuration information of distributed antennas) of the DAS and antenna resource allocation information on a specific antenna or antenna group aimed at each UE. The base station may determine the specific antenna or antenna group aimed at the corresponding user equipment by measuring uplink signals transmitted from the user equipment or on the basis of feedback information transmitted from the user equipment. At this time, the antenna resource allocation information on each of user equipments may be information on the number and/or index of specific antennas for the corresponding user equipment or pilot pattern index information used in the corresponding antenna or antenna group.

Afterwards, the base station may transmit downlink signals, which include pilot signal, by using pilot patterns allocated to the corresponding antenna through the specific antenna or antenna group aimed at the user equipment in accordance with the DAS control information (S403).

The user equipment that has received the downlink signals may perform channel estimation per pilot pattern for the received downlink signals on the basis of the information on the pilot patterns identified through the DAS control information (S404).

The method for allocating pilot patterns per base station antenna by a DAS base station at the step S401 will be described with reference to FIG. 5 to FIG. 7.

Figure 5:
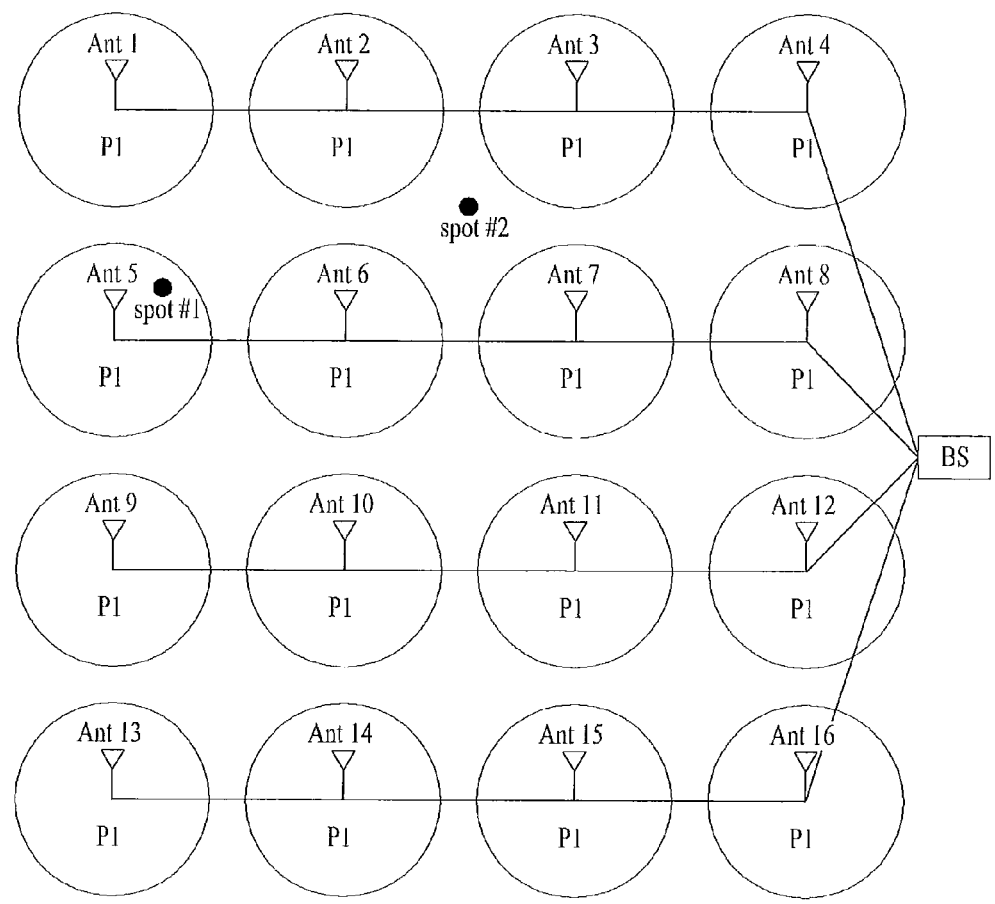
FIG. 5 is a diagram illustrating an example of a distributed antenna system that uses pilot patterns according to one embodiment of the present invention.

FIG. 5 is a diagram illustrating an example of a distributed antenna system that uses pilot patterns according to one embodiment of the present invention.

Referring to FIG. 5, the DAS according to one embodiment of the present invention uses 16 distributed antennas. If coverage areas of the respective distributed antennas are not overlapped with each other, even though the same pilot pattern is used for the respective distributed antennas, pilot interference per antenna may be reduced. At this time, if the user equipment is located within coverage of the antenna like spot#1, the user equipment performs communication with the base station through the corresponding distributed antenna Ant 5. However, since coverage per distributed antenna is not sufficient, the user equipment located at spot#2 cannot perform communication with the base station by using the distributed antennas.

Figure 6:
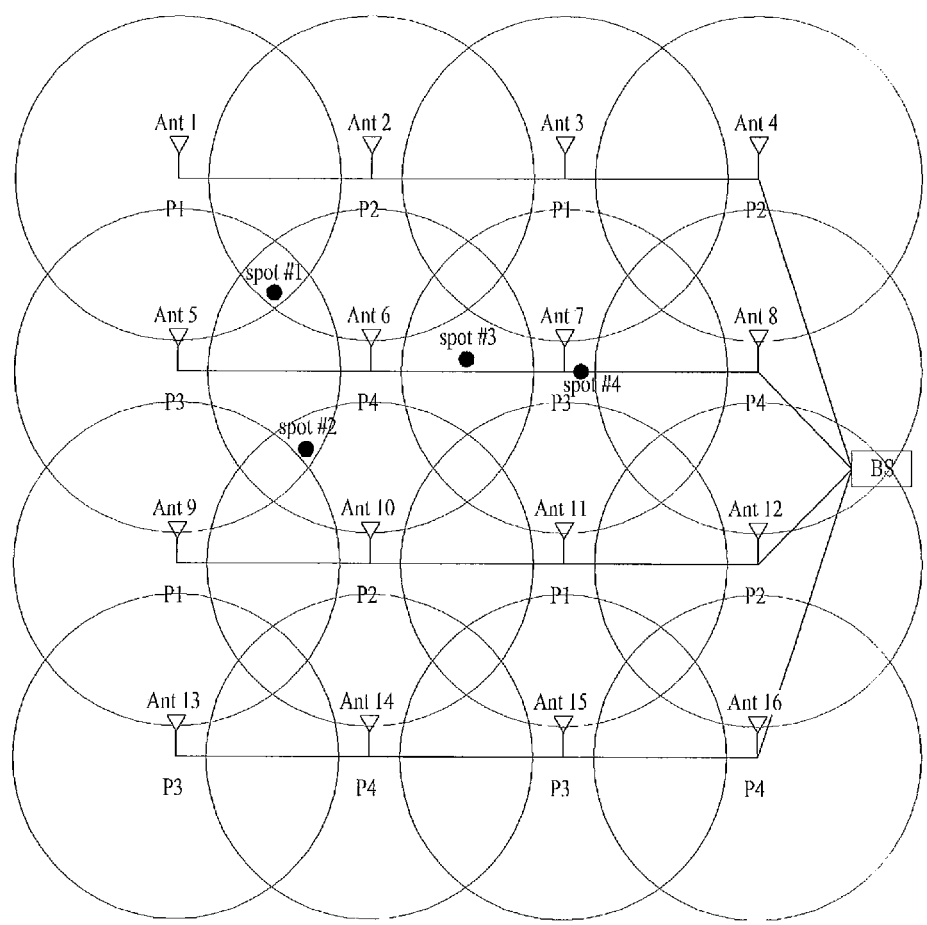
FIG. 6 is a diagram illustrating another example of a distributed antenna system that uses pilot patterns according to one embodiment of the present invention.

FIG. 6 is a diagram illustrating another example of a distributed antenna system that uses pilot patterns according to one embodiment of the present invention.

Referring to FIG. 6, the DAS according to one embodiment of the present invention uses 16 distributed antennas, and coverage areas of the respective distributed antennas may partially be overlapped with each other and neighboring antennas of which coverage areas are overlapped with each other may be configured to use different pilot patterns.

Accordingly, if coverage areas of two antennas are partially overlapped with each other as shown in FIG. 6, each of two antennas may be allocated to use the pilot pattern different from that of the other antenna, for example if two types of pilot patterns P1 and P2 are provided, one antenna may be allocated to use pilot pattern P1 and another antenna may be allocated to use pilot pattern P2. In other words, the antennas (for example, Ant 1, Ant 3, Ant 6, Ant 8, Ant 9, Ant 11, Ant 14, and Ant 16) of which coverage areas are not overlapped with each other may reduce interference even though they use the same pilot pattern P1.

For example, if the user equipment is located at a region (for example, spot#1) where coverage areas of two distributed antennas Ant 2 and Ant 6 are overlapped with each other, the corresponding user equipment may estimate a channel from the antenna Ant 2 by using P2 and a channel from the antenna Ant 6 by using P1. At this time, since the user equipment may perform communication with the base station through both the antennas Ant 2 and Ant 6, it may transmit and receive independent data streams of rank 2 at the same time.

For another example, the user equipment located at a region adjacent to the antenna Ant 7 within coverage of the antenna Ant 7 such as a spot#2 may estimate a channel for one distributed antenna and may perform communication with the base station through one distributed antenna only, whereby transmission of rank 1 may only be performed.

If all the antennas are configured to use the same pilot pattern (for example, P1) in the DAS shown in FIG. 6, the user equipment located at a region (for example, spot#1) where coverage areas of two antennas are overlapped with each other estimates a channel corresponding to the two antennas as an effective channel. Accordingly, the base station cannot transmit two independent data streams to the user equipment located at the spot#1 at the same time by using the two distributed antennas corresponding to the spot#1 in cooperation. Also, if two or more user equipments are located within the region where coverage areas of a plurality of antennas are overlapped with each other and perform communication with the other user equipment through each antenna, the same pilot pattern (for example, P1) may interfere communication with the other user equipment.

In other words, the number of pilot patterns used in the DAS may be determined in accordance with the size of the antenna coverage during pilot pattern allocation to a plurality of antennas according to the embodiment of the present invention.

Figure 7:
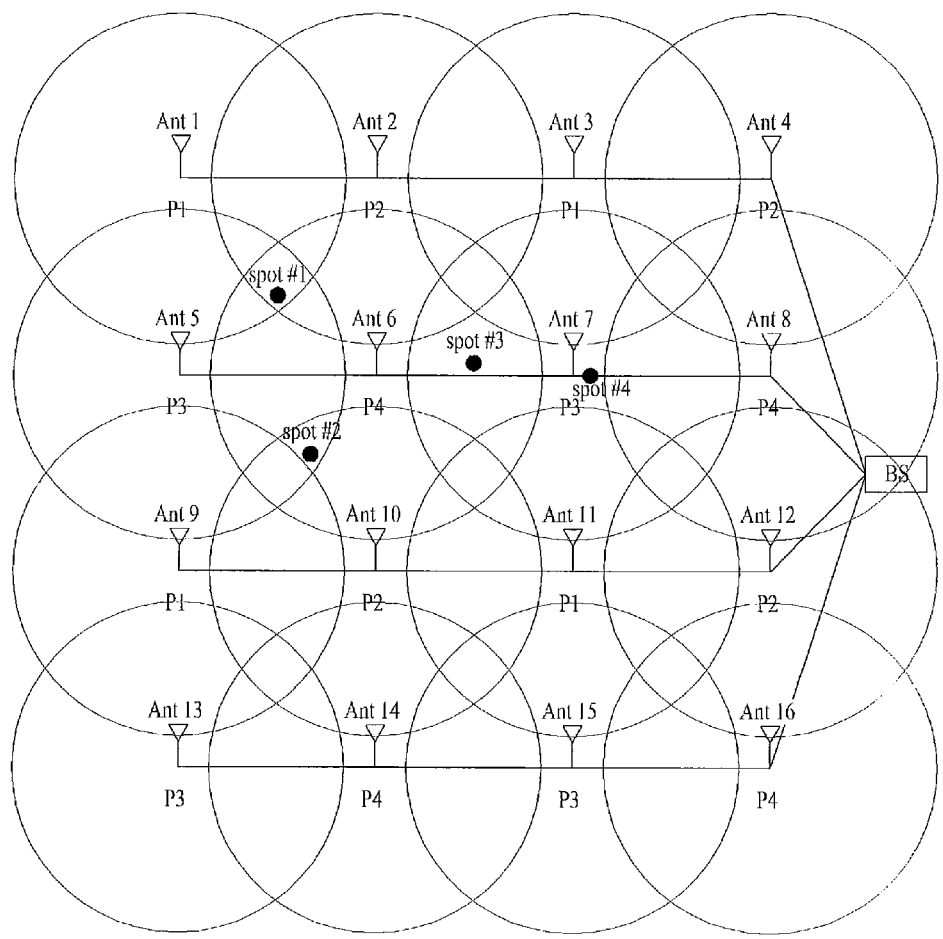
FIG. 7 is a diagram illustrating still another example of a distributed antenna system that uses pilot patterns according to one embodiment of the present invention.

FIG. 7 is a diagram illustrating still another example of a distributed antenna system that uses pilot patterns according to one embodiment of the present invention.

Referring to FIG. 7, the DAS according to one embodiment of the present invention uses 16 distributed antennas, and coverage of the respective distributed antennas may be more extended than that shown in FIG. 6, whereby coverage areas of four antennas may be overlapped with one another. Likewise, neighboring antennas of which coverage areas are overlapped with each other may be configured to use different pilot patterns, whereby a total of pilot patterns P1, P2, P3 and P4 may be used in the exemplary DAS.

In FIG. 7, pilot patterns transmitted through each of four distributed antennas (for example, Ant 1, Ant 2, Ant 5 and Ant 6) of which coverage areas are overlapped with one another are configured to be used from P1 to P4, respectively, whereby the user equipment located within a region where coverage areas of the distributed antennas are overlapped with each other may transmit and receive maximum four data streams at the same time without interference between the pilot patterns. In other words, the antennas (for example, Ant 1, Ant 3, Ant 9, and Ant 11) of which coverage areas are not overlapped with one another may reduce interference even though the same pilot pattern P1 is used.

For example, if the user equipment is located at a region of the spot#1, since it is within coverage of Ant 1, Ant 2, Ant 5 and Ant 6, it may transmit and receive the respective pilot patterns P1 to P4 through a total of four distributed antennas in accordance with maximum rank 4. If the user equipment is located at a region of the spot#2, since it is within coverage of Ant 5, Ant 6, and Ant 10, it may transmit and receive the respective pilot patterns P3, P4 and P2 through a total of three distributed antennas in accordance with maximum rank 3. If the user equipment is located at a region of the spot#3, since it is within coverage of Ant6 and Ant7, it may transmit and receive the respective pilot patterns P4 and P3 through a total of two distributed antennas in accordance with maximum rank 2. If the user equipment is located at a region of the spot#4, since it is within coverage of Ant 7, may transmit and receive the pilot pattern P3 through a single antenna in accordance with rank 1.

If the pilot patterns are allocated as described above, the user equipment may detect one or more of a total of four pilot patterns regardless of its location, and may estimate its corresponding channel at the region where the user equipment is located.

According to the embodiments illustrated in FIG. 5 to FIG. 7, various pilot patterns may be allocated to one DAS in accordance with coverage size of each antenna.

2. Second Embodiment

The Number of Antennas of which Coverage Areas are Overlapped with Each Other is More than the Number of Pilot Patterns The DAS may use a plurality of distributed antennas more than 8, and may not be configured to use different pilot patterns per neighboring antennas if the number of antennas of which coverage areas are overlapped with each other is more than the number of pilot patterns used in the corresponding system as coverage of the respective antennas is widely allocated.

Also, in the DAS, base station antennas may not be distributed uniformly at constant intervals but be centralized at some zone or one distributed antenna may be configured by multiple antennas at a specific zone. In other words, the number of antennas of which coverage areas are overlapped with each other may be more increased at a certain region within a cell than at the other region within the cell. Alternatively, it may be inefficient that a pilot pattern allocation rule is applied to all the antennas as signal strength of each base station antenna is not uniform.

For example, supposing that one to twelve pilot patterns are used in accordance with a location of the user equipment within a DAS cell, if the number of basic pilot patterns is defined as 12, the user equipment may identify all the antennas at all the regions regardless of the region where the user equipment is located within the cell, and may estimate its channel. However, if twelve pilot patterns are allocated, overhead of the pilot resources is increased.

Also, if the existing CAS and the DAS are used together, the existing pilot pattern may be maintained to support a legacy user equipment based on the existing CAS. Since the number of maximum antennas is set to 8tx in the existing CAS and maximum eight pilot patterns may be used, if the number of pilot patterns more than 9 is used in the DAS, pilot overhead is increased and system throughput becomes inefficient.

Accordingly, according to the other embodiment of the present invention, if a certain number of basic pilot patterns (for example, less than 8) are set in the DAS and the number of antennas of which coverage areas are overlapped with each other is more than the number of pilot patterns as antennas are additionally provided for system throughput, pilot patterns allocated for the additional antennas may be used by utilizing the pilot patterns already allocated to the antennas.

In the second embodiment of the present invention, the distributed antennas distributed in the DAS cell are divided into 'basic antennas' and 'additional antennas' in comparison with the first embodiment.

The antennas distributed in the DAS cell at constant intervals may be defined as the 'basic antennas'. The additional antennas may be defined as additional antennas to improve system throughput after the basic antennas located at constant intervals are installed or any one antenna located at a region where a plurality of antennas are centralized in accordance with a channel status during DAS cell configuration.

Also, the basic antennas may be the existing CAS antennas and the additional antennas may be DAS antennas in the hybrid system of the CAS and the DAS.

Figure 8:
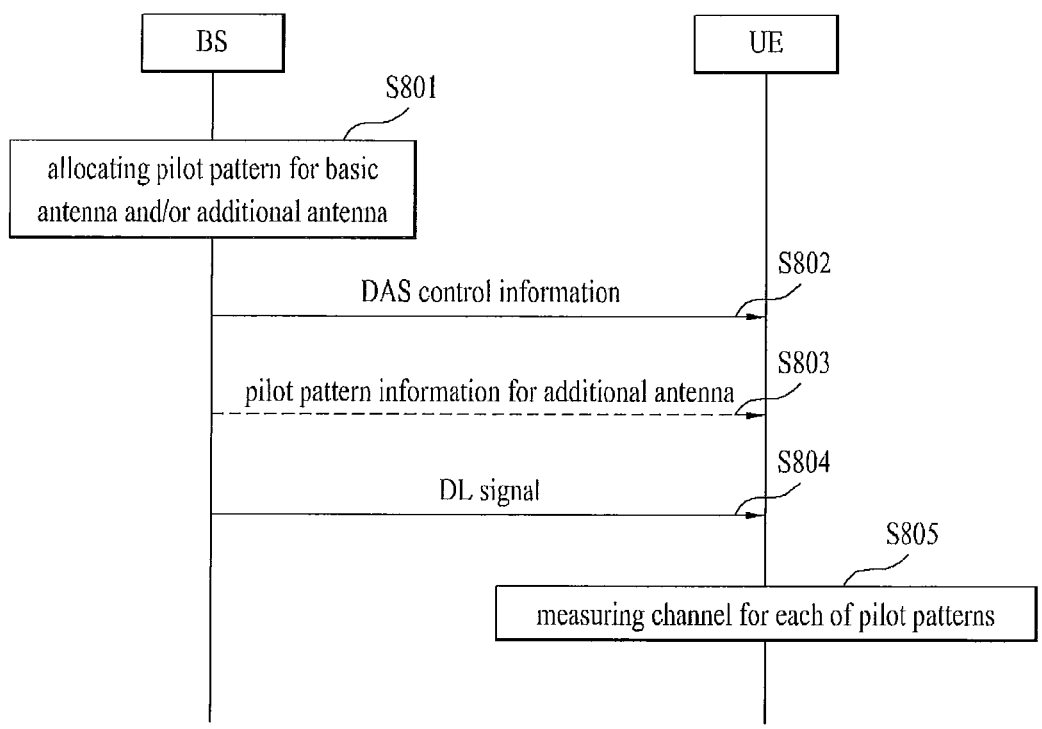
FIG. 8 is a diagram illustrating another example of transmitting and receiving a signal by allocating pilot patterns per antenna in a DAS according to one embodiment of the present invention.

FIG. 8 is a diagram illustrating another example of transmitting and receiving a signal by allocating pilot patterns per antenna in a DAS according to one embodiment of the present invention.

Referring to FIG. 8, a DAS base station according to one embodiment of the present invention allocates pilot patterns to each antennas to allow two or more antennas to use the same pilot pattern depending on coverage size of each of base station antennas distributed in a cell region and the number of overlapped coverage areas of the antennas (S801). Pilot pattern allocation for each antenna may be performed during system basic configuration or may be changed semi-statically depending on conditions (for example, channel status, transmission mode change, etc.).

At this time, basic pilot patterns are basically allocated to each of the basic antennas located within a DAS cell, and pilot patterns may separately be added for additional antennas for improvement of system throughput or may be allocated to be used by utilizing the basic pilot patterns.

The basic pilot patterns are those to be basically read by the user equipment located within the DAS cell, and may be defined by the CAS based existing standard or may newly be defined for the DAS based system. The DAS base station according to one embodiment of the present invention may determine the number of basic pilot patterns in accordance with various standards.

The pilot patterns for additional antennas may be configured in such a manner that any one of basic pilot patterns used by neighboring basic antenna has frequency/time resources differently from the other basic pilot patterns or is cyclic shifted in frequency/time domains. The pilot patterns for additional antennas may be allocated in such a manner that different sequences/codes are used at the same pilot pattern.

Antennas may be added during basic configuration of the system, or may be added in the DAS of which basic configuration has already been performed. Accordingly, the pilot patterns for additional antennas may be determined at the step S801 together with basic pilot pattern allocation, or may be performed separately after the basic pilot patterns are allocated. The method for allocating the pilot patterns for additional antennas will be described in brief with reference to FIG. 9 to FIG. 11.

After pilot pattern allocation for the antennas is performed by the base station, the DAS base station transmits DAS control information, which includes information on the number of basic pilot patterns allocated to DAS antennas, to the user equipment (S802). At this time, if pilot pattern allocation for additional antennas is performed simultaneously with basic pilot pattern allocation, pilot pattern allocation information for additional antennas may be included in the DAS control information. The pilot pattern allocation information for the additional antennas will be described in brief in the embodiments of FIG. 9 and FIG. 10.

Likewise, the DAS control information may further include configuration information of the DAS system and antenna resource allocation information on a specific antenna or antenna group aimed to each of user equipments belonging to the DAS. The base station may determine a specific antenna or antenna group dedicated to the corresponding user equipment by measuring uplink signals transmitted from the user equipment or on the basis of feedback information transmitted from the user equipment. At this time, antenna resource allocation information for each of user equipments may be the number and/or index information of specific antennas for the corresponding user equipment, or pilot pattern index information used by the corresponding antenna or antenna group.

Transmission of the DAS control information may be performed periodically, or may be performed based on an event. An event for transmission of the DAS control information includes a case where the user equipment enters a DAS cell or a case where the user equipment moves within a DAS cell.

In the meantime, if pilot pattern allocation for additional antennas is performed after basic pilot pattern allocation for the basic antennas located in the DAS cell, the base station may separately transmit pilot pattern information for the additional antennas to the user equipment (S803).

At this time, the base station may transmit the pilot pattern information on the transmitted additional antennas together with information on the additional antennas in accordance with a predetermined period, or may transmit the pilot pattern information on the transmitted additional antennas if necessary only such as a case where event occurs in the user equipment. For example, if the user equipment enters coverage of the additional antennas, the base station may transmit the information on the pilot patterns of the additional antennas to the corresponding user equipment through unicast transmission.

Afterwards, the base station may transmit downlink signals, which include pilot signal, by using pilot patterns allocated to the corresponding antenna through the specific antenna or antenna group dedicated to the user equipment in accordance with the DAS control information (S804). At this time, the specific antenna or antenna group of the user equipment may include the basic antennas and/or additional antennas.

The user equipment that has received the downlink signals may perform channel estimation per pilot pattern for the received downlink signals on the basis of the number of the basic pilot patterns and the pilot pattern information on the additional antennas, which are identified through the DAS control information (S805).

The method for allocating pilot patterns per base station antenna from the DAS base station at the step S801 will be described with reference to FIG. 9 to FIG. 11.

(1) In the method for allocating pilot patterns per antenna in the DAS according to the embodiment of the present invention, additional pilot patterns for pilot patterns basically allocated during initial configuration of the DAS may newly be defined.

Figure 9:
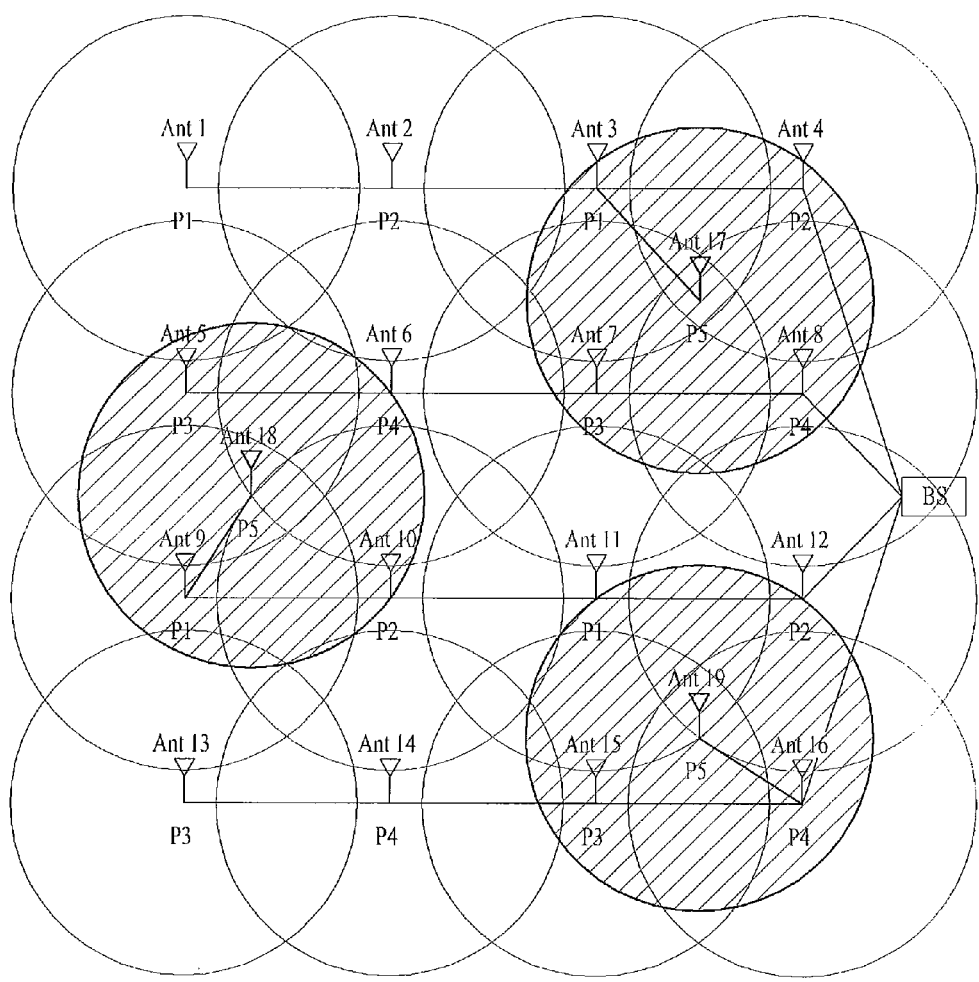
FIG. 9 is a diagram illustrating further still another example of a distributed antenna system that uses pilot patterns according to one embodiment of the present invention.

FIG. 9 is a diagram illustrating further still another example of a distributed antenna system that uses pilot patterns according to one embodiment of the present invention.

Referring to FIG. 9, a DAS according to one embodiment of the present invention basically uses 16 distributed antennas Ant 1 to Ant 16, and may be configured in such a manner that coverage areas of four antennas are overlapped with one another. Likewise, neighboring antennas of which coverage areas are overlapped with each other may be configured to use different pilot patterns, whereby the DAS may use a total of four pilot patterns of P1, P2, P3 and P4 as the basic pilot patterns allocated to the base station antenna.

The basic pilot patterns are those to be basically read by the user equipment located within the cell, and may be defined by the CAS based existing standard or may newly be defined for the DAS based system. The DAS base station according to one embodiment of the present invention may determine the number of basic pilot patterns in accordance with various standards.

In this case, if distributed antennas Ant 17, Ant 18 and Ant 19 are additionally installed as shown in FIG. 9, coverage areas of antennas where the additional antennas are located are more overlapped with each other than that of the other area. Other pilot pattern P5 not the basic pilot pattern may additionally be allocated to the additional antennas temporarily or permanently. In other words, the additional pilot pattern P5 in addition to the basic pilot patterns P1, P2, P3 and P4 may be provided temporarily or permanently in order to detect the additional pilot pattern P5 only if the user equipment enters a specific zone within a cell (for example, zone where Ant 18 is located), without increasing the number of the basic pilot patterns allocated to the corresponding DAS in accordance with addition of the distributed antennas.

As described above, if the other pilot pattern in addition to the basic pilot patterns is additionally provided in accordance with one embodiment of the present invention, the DAS base station may transmit additional pilot pattern information as pilot pattern information on the additional antenna according to one embodiment of the present invention through the DAS control information at the step 802 shown in FIG. 8 or separate signaling at the step S803.

The user equipment that has received the additional pilot pattern information may perform channel estimation per pilot pattern for the downlink signals transmitted from the base station on the basis of the information on the number of basic pilot patterns and additional pilot patterns at the step S805.

(2) The method for allocating pilot patterns to each antenna according to another embodiment of the present invention may use radio resource multiplexing schemes to reduce interference between antennas of which coverage areas are overlapped with each other.

An example of the radio resource multiplexing schemes includes a frequency division multiplexing (FDM) scheme, a time division multiplexing (TDM) scheme, a code division multiplexing (CDM) or a hybrid scheme of frequency and time division multiplexing schemes. The FDM scheme is intended to allocate frequency bands to each of user equipments without overlap by dividing frequency resources of shared radio resources. The FDM scheme is an asynchronous scheme in which specific signals are recovered through filtering. The TDM scheme is intended to allocate transmission timing of shared radio resources to each of user equipments by dividing the transmission timing. The TDM scheme is a synchronous scheme in which specific signals may be received by selection of time slots and timing information is required. The radio resource multiplexing scheme such as the existing FDM or TDM scheme shares radio resources within a cell region where the base station provides services regardless of antennas.

In the method for using pilot patterns in a DAS according to other embodiment of the present invention, radio resources are used for antennas of which coverage areas are overlapped with each other, by being divided into frequency or time resources in accordance with the FDM or TDM scheme.

Figure 10:
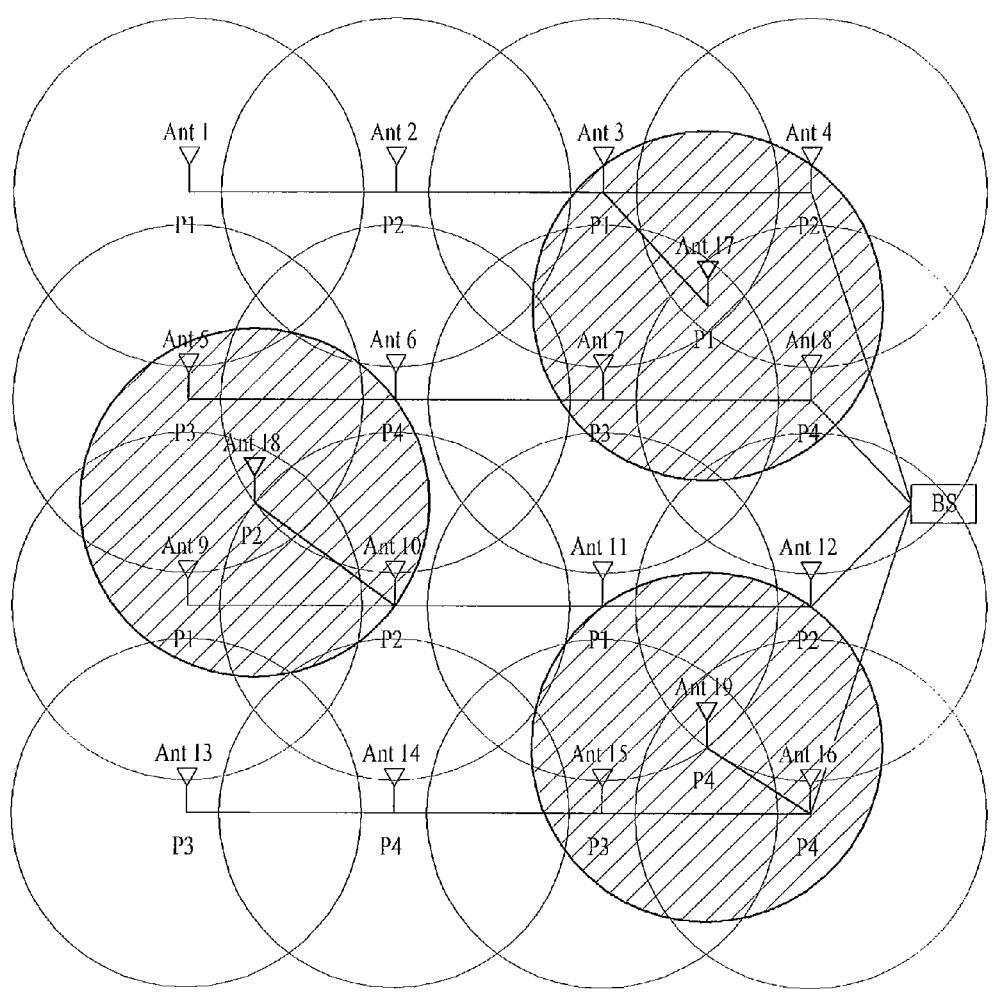
FIG. 10 is a diagram illustrating further still another example of a distributed antenna system that uses pilot patterns according to one embodiment of the present invention.

FIG. 10 is a diagram illustrating further still another example of a distributed antenna system that uses pilot patterns according to one embodiment of the present invention.

Referring to FIG. 10, a DAS according to one embodiment of the present invention basically uses 16 distributed antennas Ant 1 to Ant 16, and may be configured in such a manner that coverage areas of four antennas are overlapped with one another. Also, the DAS may allocate a total of four pilot patterns such that neighboring antennas of which coverage areas are overlapped with each other use different basic pilot patterns P1, P2, P3 and P4.

In this case, if distributed antennas Ant 17, Ant 18 and Ant 19 are additionally installed as shown in FIG. 10, some area of coverage of each additional antenna is overlapped with coverage of the basic antennas. At this time, the additional antennas may be configured in such a manner that their pilot patterns may be shared by any one of the basic pilot patterns used in a neighboring basic antenna of the additional antennas in view of time or frequency resources.

For example, if coverage areas of the basic antennas of Ant 3, Ant 4, Ant 7 and Ant 8 are overlapped with one another and at the same time corresponds to coverage of Ant 17 as shown in FIG. 17, any one of the basic pilot patterns P1, P2, P3 and P4 used by the basic antennas Ant 3, Ant 4, Ant 7 and Ant 8 may be used for the additional antenna Ant 17, and resources to which the corresponding pilot pattern is transmitted may be used by being divided in view of frequency, time or sequence/code.

The method for using the same pilot pattern between basic antennas and additional antennas through division will be described in brief with reference to FIG. 11.

Figure 11:
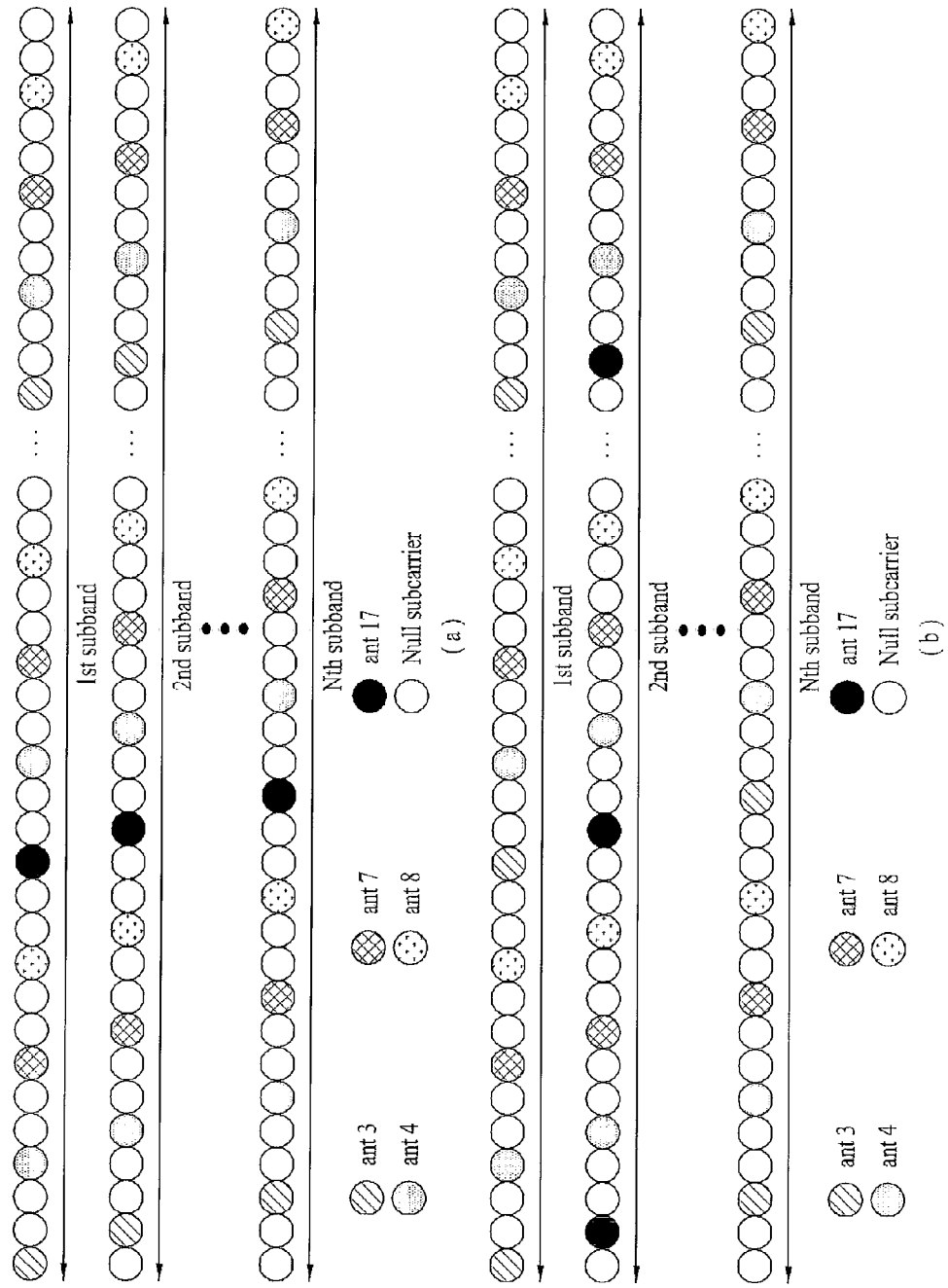
FIG. 11 is a diagram illustrating further still another example of a distributed antenna system that uses pilot patterns according to one embodiment of the present invention.

FIG. 11 is a diagram illustrating an example of pilot patterns transmitted from a DAS according to one embodiment of the present invention. In more detail, FIG. 11 illustrates an example that pilot patterns are divided in a frequency unit, wherein frequency division may be performed by a unit of component carrier, sub-band, resource block, and sub-carrier.

Referring to FIG. 11, pilot signals transmitted through four neighboring antennas of a plurality of distributed antennas of the base station may be transmitted at the locations of different subcarriers on a specific OFDMA symbol within one frame. For example, the pilot signals transmitted through four antennas of Ant 3, Ant 4, Ant 7 and Ant 8 shown in FIG. 10 may be transmitted at the locations of different subcarriers and may use independent pilot patterns P1 to P4. The pilot signals corresponding to the respective pilot patterns are repeatedly transmitted at a period of twelve subcarriers. It is assumed that the same pilot patterns used for the basic antenna Ant 3 are used for the additional antenna Ant 17.

At this time, as shown in FIG. 11(a), if the pilot signals transmitted from the pilot pattern P1 used for the basic antenna Ant 3 are divided into two and the first pilot signal of P1 is transmitted from Ant 3, resource allocation may be performed in such a manner that the second pilot signal of P1 transmitted after twelve subcarriers is transmitted from Ant 17. In this case, the pilot patterns allocated to Ant 3 and Ant 17 may be repeatedly transmitted at a period of 24 subcarriers.

Also, as shown in FIG. 11(b), pilot signals constituting pilot patterns corresponding to the respective basic antennas Ant 3, Ant 4, Ant 7 and Ant 8 may basically be transmitted for the first subband, and resources to which the pilot signal of P1 is transmitted may be allocated to the additional antenna Ant 17 for the second subband. In other words, each of subbands may be alternately allocated to Ant 3 and Ant 17.

Also, if multiple component carriers exist, the same pilot pattern may be used for the basic antennas and the additional antennas in a unit of component carriers.

Also, since division in the time domain is performed in a unit of frame, sub-frame, and slot, the same pilot pattern may alternately be used for the basic antennas and the additional antennas in a unit of resource blocks/slot or in a unit of frame/subframe from elements within a resource block.

As described above, the divided pilot resources do not always exist at the same location in the time/frequency domains, and time/frequency hopping may be performed for the pilot resources to improve channel estimation performance. For example, if the basic antenna Ant 3 uses P1 at the odd numbered resource blocks on the frequency axis in the first time slot and the additional antenna Ant 17 uses P1 at the even numbered resource blocks, hopping may be performed in such a manner that the additional antenna Ant 17 uses P1 at the odd numbered resource blocks in next time slot and the basic antenna Ant 3 uses P1 at the even numbered resource blocks.

In this way, if the basic pilot patterns are allocated to the additional antenna in accordance with the embodiment of the present invention and resources are shared between the additional antenna and its neighboring basic antenna, the DAS base station may transmit pilot pattern information on additional antennas according to the other embodiment of the present invention through the DAS control information at the step S802 of FIG. 8 or separate signaling at the step S803.

The pilot pattern information on the additional antennas according to the other embodiment of the present invention may include resource division mode index information on the basic pilot patterns and/or index information of the basic pilot patterns which are divided. In this case, the resource division mode index means an index on each of divided modes if the method for allocating basic pilot patterns to additional antennas through division is defined and divided into a plurality of modes, and each of the plurality of modes is indexed. In this mode, even a case where resources are not divided may be set as one mode. The resource division mode may include index information of the basic pilot patterns to which resource division is applied.

Accordingly, the user equipment may perform channel estimation per pilot pattern at the step S805 through information on the number of basic pilot patterns, and may perform channel estimation for increased pilot patterns by identifying the information on the number of basic pilot patterns through the resource division mode index whenever resource division for the basic pilot patterns is performed for the additional antennas.

The pilot patterns used for the additional antennas in the DAS in accordance with the embodiments of the present invention may be configured in such a manner that the same pilot pattern is used for the same resource region intentionally to improve channel estimation performance when the basic antennas and the additional antennas transmit the same data streams if the basic pilot patterns are allocated to be used respectively for frequency/time/code resource regions. In other words, in the aforementioned embodiments, pilot resources transmitted from Ant 3 only, pilot resources transmitted from Ant 17 only and pilot resources transmitted from Ant 3 and Ant 17 at the same time/frequency/code location may be defined.

Alternatively, all the distributed antennas within the DAS may be configured into one or more groups by considering system signaling and complexity, and frequency or time resources to which pilots are allocated may be divided and used in accordance with the number of antenna groups.

For example, if numbering is performed for all the DAS antennas, frequency/time resources may be divided into two groups, whereby the odd numbered antennas use the basic pilot patterns in the first resource group in due order and the even numbered antennas use the basic pilot patterns in the second resource group in due order. In this case, no signals may be transmitted from the odd numbered antennas in pilot transmission region of the second resource group, this way may be also applied to the even numbered antennas.

Even in this case, time/frequency resource groups allocated to increase accuracy of channel estimation based on pilots may be changed temporarily, or frequency/time hopping may be performed for the resource groups, whereby the resource group may actually be mapped into resources.

(3) In the method for allocating pilot patterns per antenna according to another embodiment, different pilot sequences are used between antennas of which coverage areas are overlapped with each other.

In order to reduce interference between antennas of which coverage areas are overlapped with each other in the DAS according to the embodiments of the present invention shown in FIG. 9 or FIG. 10, while a signal may be transmitted in the same pilot region from the antennas, sequences of pilot may be configured differently. For example, if orthogonal sequences are used, even though neighboring antennas of which coverage areas are overlapped with each other use the same pilot pattern, interference between antennas may be reduced. Even in this case, sequences may be allocated in a unit of each antenna such that any one of a plurality of basic antennas may use sequences different from those of additional antenna, or the entire antennas may be configured into one or more groups such that each group may use sequences different from those of the other group.

As described above, according to the embodiments of the present invention, pilot patterns may not be allocated fixedly to each of a plurality of antennas which belong to the DAS but be allocated in accordance with addition of antennas or the location of the user equipment in due order. For example, if the user equipment located within coverage of antennas distributed in a zone within a cell does not exist, the pilot patterns may not be allocated until any other user equipment enters corresponding additional antenna coverage. Accordingly, although the additional antennas have been provided within the DAS cell zone provided with the basic antennas to improve system throughput, if the user equipment located within coverage of the additional antennas does not exist, the pilot patterns may be allocated in the same manner as FIG. 7.

The user equipment and the base station belonging to the DAS, through which the aforementioned embodiments of the present invention can be carried out will be described with reference to FIG. 12.

Figure 12:
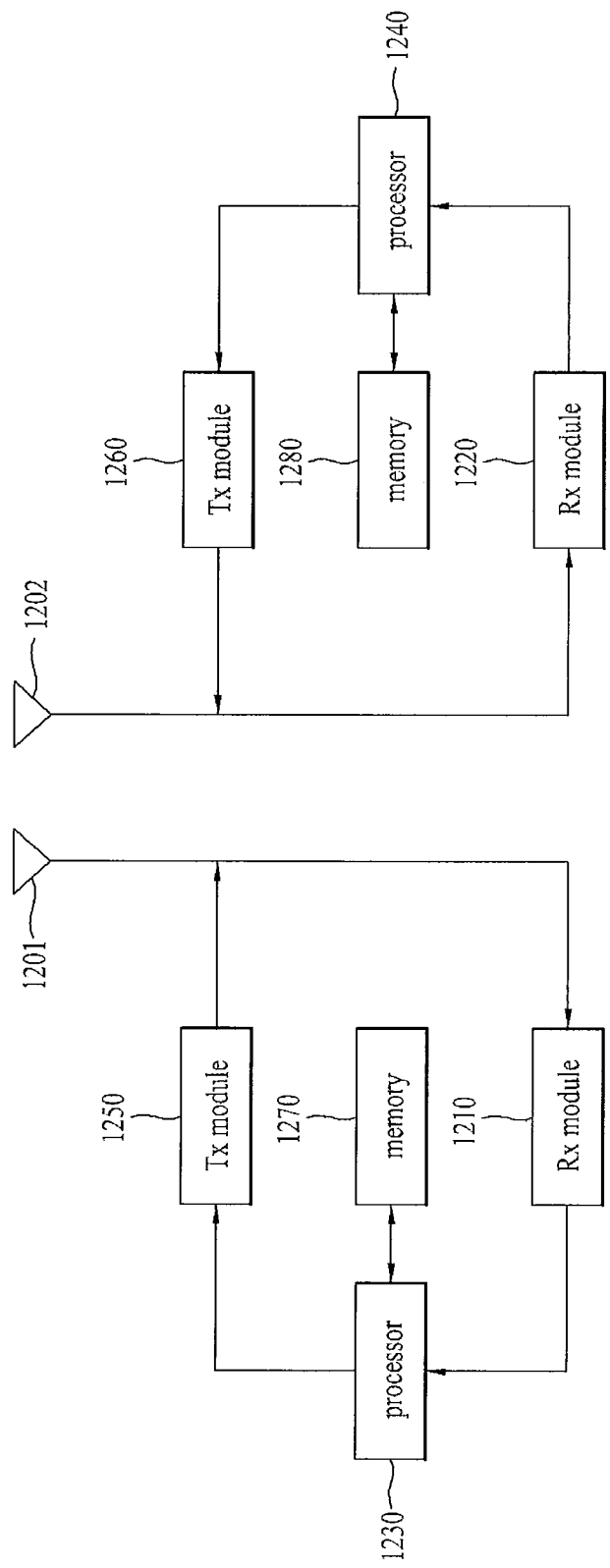
FIG. 12 is a block diagram illustrating a base station and a user equipment through which the embodiments of the present invention can be carried out.

FIG. 12 is a block diagram illustrating a base station and a user equipment, through which the embodiments of the present invention can be carried out.

The user equipment may be operated as a transmitter on an uplink and as a receiver on a downlink. Also, the base station may be operated as a receiver on the uplink and as a transmitter on the downlink. In other words, each of the user equipment and the base station may include a transmitter and a receiver for transmission of information or data.

The base station and the user equipment may include a processor, modules, parts, and/or means for implementing the embodiments of the present invention. Especially, the base station and the user equipment may include a module (means) for encrypting messages, a module for interpreting encrypted messages, an antenna for transmitting and receiving messages, etc.

Referring to FIG. 12, the left part represents the base station belonging to the DAS, and the right part represents the user equipment that enters a cell supported by the base station. Each of the base station and the user equipment may include an antenna module 1201 or 1202, a Reception (Rx) module 1210 or 1220, a processor 1230 or 1240, a Transmission (Tx) module 1250 or 1260, and a memory 1270 or 1280.

The antenna module 1201 or 1202 includes a receiving antenna receiving radio frequency (RF) signals and transferring the RF signals to the Rx module 1210 or 1220 and a transmitting antenna transmitting the signals generated from the Tx module 1250 or 1260 to the outside. If a Multiple Input Multiple Output (MIMO) function is supported, two or more antennas may be provided.

The antenna module 1201 of the base station shown in FIG. 12 represents one or more distributed antennas (Das) selected from the entire antennas of the base station on the basis of the channel status during communication, the location of the user equipment, and the distance between the base station and the user equipment. The selected one or more DAs may not be fixed but be changed depending on location change of the user equipment.

The Rx module 1210 or 1220 may perform decoding and demodulation for the RF signals externally received through the antenna to recover original data and then transfer the recovered data to the processor 1230 or 1240. The Rx module and the antenna may be incorporated into a receiving portion for receiving the RF signal unlike FIG. 12.

The processor 1230 or 1240 generally controls the overall operation of the base station or the user equipment. In particular, the processor 1230 or 1240 may perform a controller function for implementing the aforementioned embodiments of the present invention, a variable Medium Access Control (MAC) frame control function based on service characteristics and a propagation environment, a handover (HO) function, an authentication and encryption function, etc.

The Tx module 1250 or 1260 may perform predetermined coding and modulation for data, which are scheduled from the processor 1230, 1240 and then transmitted to the outside, and then may transfer the coded and modulated data to the antenna. The Tx module and the antenna may be incorporated into a transmitting portion for transmitting the radio signal unlike FIG. 12.

The memory 1270 or 1280 may store a program for processing and control of the processor 1230 or 1240, or may perform a function for temporarily storing input/output data (uplink (UL) grant allocated from the base station in case of the user equipment), system information, base station identifier (STID), flow identifier (FID), and action time.

Also, the memory 1270 or 1280 may include at least one type of storage media such as a flash memory, a hard disk, a multimedia card micro, a card-type memory (e.g. a Secure Digital (SD) or eXtreme Digital (XD) memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disc, an optical disc, etc.

The processor 1230 of the transmitter performs the whole control operation for the base station. Also, the processor 1230 of the transmitter may perform pilot pattern allocation per distributed antennas or antenna group according to the embodiments of the present invention with reference to FIG. 4 to FIG. 11. At this time, separate pilot patterns may be allocated for additional antennas within the system or basic pilot patterns may be used for the additional antennas.

Also, the processor 1230 of the transmitter may include configuration information on the DAS, information on distributed antennas or antenna group to be used for communication with each of user equipments, and DAS control information that includes pilot pattern allocation information on each antenna.

The user equipment may acquire various kinds of configuration information on the DAS and information on antennas or antenna group to be used for communication with the base station by receiving the signal and the DAS control information from the base station through the Rx module 1220.

The processor 1240 of the user equipment performs the whole control operation for the user equipment, and may perform channel estimation pilot pattern by measuring downlink signals transmitted from the base station. Also, the processor 1240 of the user equipment may include information on base station antenna based on receiving intensity per antenna and feedback information based on channel estimation.

Meanwhile, the base station may perform a control function for performing the aforementioned embodiments of the present invention, an orthogonal frequency division multiple access (OFDMA) packet scheduling, time division duplex (TDD) packet scheduling and channel multiplexing function, a medium access control (MAC) frame variable control function based on service characteristics and radio wave condition, a quick traffic real-time control function, a handover function, an authentication and encryption function, a packet modulation and demodulation function for data transmission, a quick packet channel coding function and a real-time modem control function through at least one of the aforementioned modules, or may further include a separate means, module, or part for performing the aforementioned functions.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention may be applied to a wireless communication system. In more detail, the present invention may be applied to a method for transmitting a signal in a wireless communication system and an apparatus for the same, and a method for receiving a signal in a wireless communication system and an apparatus for the same.

The invention claimed is:

1. A base station in a distributed antenna system (DAS), comprising:
   a transmission module for transmitting a signal;
   an antenna module which includes a plurality of antennas, and in which a predetermined number of pilot patterns are used in accordance with the size of the coverage area, which is a signal transmission range, for each of the plurality of antennas, and in accordance with the number of overlapped coverage areas of the plurality of antennas; and
   a processor which transmits, through the transmission module, a signal to a user equipment using a pilot pattern corresponding to at least one of the plurality of antennas, wherein the same pilot pattern is used for the antennas of which coverage areas are not overlapped with each other, among the plurality of antennas.

2. The base station according to claim 1, wherein the processor generates control information which includes information on the number of the pilot patterns used in the antenna module, and transmits the generated control information to the user equipment through the transmission module.

3. The base station according to claim 1, wherein different pilot patterns are used for the antennas of which coverage areas are overlapped with each other.

4. The base station according to claim 3, wherein the first antenna of the plurality of antennas uses the same pilot pattern as a pilot pattern used by the second antenna of which coverage area is overlapped with coverage area of the first antenna, and the first antenna and the second antenna use the same pilot patterns at different frequency or time resource regions.

5. The base station according to claim 4, wherein the first antenna is either the antenna added after the predetermined number of pilot patterns are configured in the antenna module or the antenna located in a cell where the number of overlapped coverage areas of the plurality of antennas is more than a predetermined reference, among cells for which the base station provides a service.

6. The base station according to claim 4, wherein the processor generates information on pilot patterns of the first antenna and transmits the generated information to the user equipment through the transmission module, and the pilot pattern information on the first antenna includes resource division mode information on the pilot patterns to which resource division is applied or index information on the pilot patterns to which resource division is applied.

7. The base station according to claim 3, wherein the first antenna of the plurality of antennas uses the same pilot pattern as a pilot pattern used by the second antenna of which coverage area is overlapped with coverage area of the first antenna and which is adjacent to the first antenna, and the first antenna and the second antenna use different pilot sequences at the same pilot pattern.

8. A user equipment in a distributed antenna system (DAS), comprising:
a reception module for receiving a signal; and
a processor which performs channel estimation for a channel over which the signal is transmitted, by using the received signal,
wherein the processor performs the channel estimation for each of pilot patterns for the received signal on the basis of information on a predetermined number of the pilot patterns used in accordance with the size of the coverage area, which is a signal transmission range, for each of a plurality of antennas, and in accordance with the number of overlapped coverage areas of the plurality of antennas received from a base station that includes the plurality of antennas, through the reception module.

9. The user equipment according to claim 8, wherein the processor receives pilot pattern information on a specific antenna through the reception module, the specific antenna using the same pilot pattern as pilot pattern of a neighboring antenna of which coverage area is overlapped with coverage area of the specific antenna, among the plurality of antennas of the base station, and using the same pilot pattern at different frequency or time resource regions.

10. The user equipment according to claim 9, wherein the processor performs channel estimation for each of the pilot patterns for the received signal on the basis of the pilot pattern allocation information and the pilot pattern information on the specific antenna.

11. A method for transmitting a signal from a base station to a user equipment in a distributed antenna system (DAS), the method comprising the steps of:
allocating a predetermined number of pilot patterns to a plurality of antennas in accordance with the size of the coverage area, which is a signal transmission range, for each of the plurality of antennas, and in accordance with the number of overlapped coverage areas of the plurality of antennas; and
transmitting the signal to the user equipment through a specific antenna or antenna group associated with the user equipment in accordance with pilot patterns allocated to the plurality of antennas,
wherein the same pilot pattern is allocated to the antennas of which coverage areas are not overlapped with each other, among the plurality of antennas.

12. The method according to claim 11, further comprising the step of transmitting control information which includes information on the number of the pilot patterns allocated to the plurality of antennas, to the user equipment.

13. A method for receiving a signal in a user equipment from a base station in a distributed antenna system (DAS), the method comprising the steps of:
receiving control information from the base station, which includes a plurality of antennas, the control information including pilot pattern allocation information on a predetermined number of pilot patterns allocated in accordance with the size of the coverage area, which is a signal transmission range, for each of the plurality of antennas, and in accordance with the number of overlapped coverage areas of the plurality of antennas; and
receiving the signal transmitted in accordance with the pilot pattern allocation information through a specific antenna or antenna group of the base station,
wherein the same pilot pattern is allocated to the antennas of which coverage areas are not overlapped with each other, among the plurality of antennas.

14. The method according to claim 13, further comprising the step of performing channel estimation for each of the pilot patterns for the received signal on the basis of the pilot pattern allocation information.

* * * * *